No. 689,800. Patented Dec. 24, 1901.
E. HAFERMEHL.
PNEUMATIC ATTACHMENT FOR BINDERS OR HEADERS.
(Application filed Mar. 23, 1901.)
(No Model.)
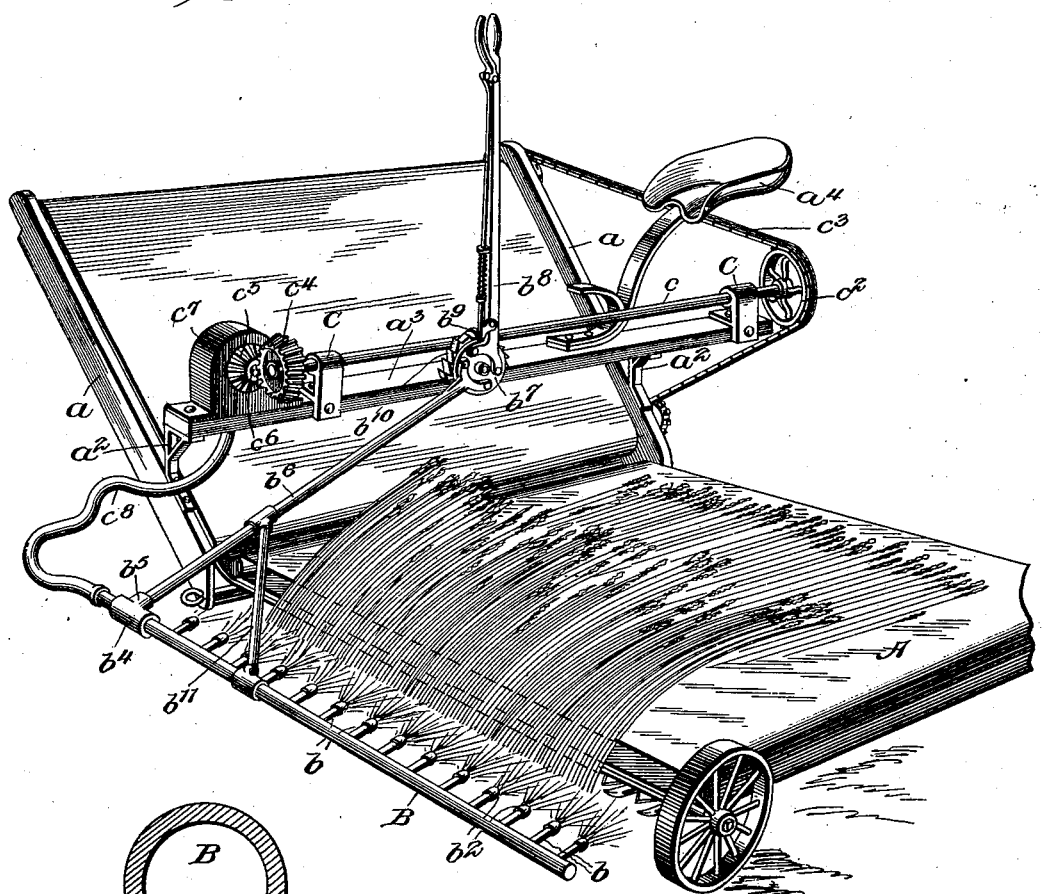
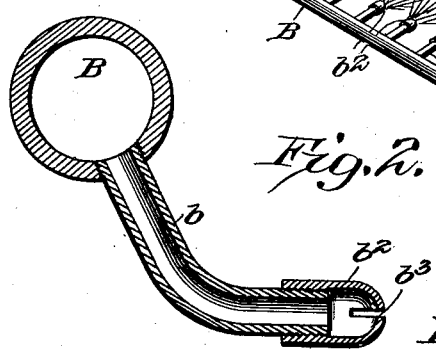

UNITED STATES PATENT OFFICE.

EDWARD HAFERMEHL, OF GUTHRIE, OKLAHOMA TERRITORY.

PNEUMATIC ATTACHMENT FOR BINDERS OR HEADERS.

SPECIFICATION forming part of Letters Patent No. 689,800, dated December 24, 1901.

Application filed March 23, 1901. Serial No. 52,583. (No model.)

*To all whom it may concern:*

Be it known that I, EDWARD HAFERMEHL, a citizen of the United States, residing at Guthrie, in the county of Logan and Territory of Oklahoma, have invented a new and useful Pneumatic Attachment for Binders or Headers, of which the following is a specification.

This invention relates to harvesting-machines; and its object is to effect in a simple, effective, and thoroughly practical manner the mowing of grain, whether standing or lying, and at the same time to obviate the beating out of the overripe cereals when the cut grain is thrown upon the platform. The means universally employed for bringing the grain into engagement with the cutter-knives and throwing it onto the platform is the ordinary reel, the construction and operation of which are well known. For standing grain and grain that is only partially beaten down it is effective; but where the grain is beaten flat to the ground it is ineffective to perform the function for which it is designed. Moreover, by the contact of the reel-blades with the heads of the grain overripe cereals will be beaten out and wasted, thus entailing a considerable loss.

To accomplish the object stated and to obviate the objections above noted, I employ in lieu of the reel a pneumatic blast, which will be thoroughly effective to throw the grain first against the cutting-knives and then onto the platform conveyer whether the grain be standing or lying flat upon the ground, and by the employment of the air-blast I effectually prevent any beating out of overripe cereals.

In accomplishing the objects sought to be attained it is immaterial whether the air be projected in jets closely assembled or in a solid sheet, the desideratum being that the impingement of the air against the grain shall be of such force and character as to bring the grain against the cutter-knives and then throw it onto the apron.

In the accompanying drawings, forming a part of this specification, and in which like letters of reference indicate corresponding parts, I have illustrated a form of embodiment of my invention capable of carrying the same into effect, it being understood that other forms of embodiment thereof may be employed without departing from the spirit of the same, and in these drawings—

Figure 1 is a view in perspective of the conveyer portion of a grain-binder, showing my improvements attached thereto. Fig. 2 is a view in longitudinal section through one of the jet pipes or nozzles, showing more particularly the contour of the outlet-opening in the discharge end of the nozzle. Fig. 3 is a detail perspective view of a portion of a modified blast-delivery device.

Referring to the drawings, A designates an ordinary platform conveyer of a grain-binder, driven by a suitable mechanism, (not necessary to be described.) At one side of this conveyer an inclined apron is arranged, and to the side pieces $a$ there are secured brackets $a^2$, supporting a platform $a^3$, which may be composed of a strip of wood or, if preferred, of pipe. Upon the platform $a^3$ is arranged a seat $a^4$ for the operator. Arranged in front of the conveyer beyond the cutting apparatus and extending parallel therewith is an air-conveyer pipe B, closed at one end and carrying a plurality of nozzles $b$, which may be straight or preferably, as shown, curved, the end of each nozzle being covered by a cap $b^2$, provided with a transverse slot $b^3$, the function of which will appear later on. The pipe B is secured at one end to a T-joint $b^4$, to the free member $b^5$ of which is connected one end of a bar $b^6$, the other end of which is secured to a pivoted disk $b^7$, journaled on the platform, to which disk is also secured a lever $b^8$, carrying at or near its lower end a spring catch or pawl $b^9$ to traverse a segmental rack-plate $b^{10}$, also secured to the platform. To brace the conveyer-pipe B and the rod $b^6$, a stay-rod $b^{11}$ is employed at a point near the juncture of the conveyer-pipe and said rod, as clearly shown in Fig. 1.

Upon the platform are mounted two brackets C, the upper portion of each of which is provided with a bearing in which works a shaft $c$, one end of which carries a sprocket-wheel $c^2$, driven by a sprocket-chain $c^3$, the latter receiving motion from the binder mechanism. On the other end of the shaft $c$ is secured a bevel-gear $c^4$, which meshes with a similar gear $c^5$, carried by a shaft $c^6$, having bearings in a casing $c^7$, the latter containing an ordinary downdraft blast-fan, (not necessary to be shown.) Connected with the lower portion of the casing or at any other appropriate point is a flexible tube $c^8$, which is attached to the open or free end of the conveyer-pipe B, and through this pipe $c^3$ the air from the fan-casing passes to the conveyer-pipe B and thence out through the nozzles.

As herein shown, the air is projected in jets toward the conveyer and preferably in an upward direction; but it is to be understood that I do not limit myself to this particular manner of projecting the air, as the same may be blown out in a solid sheet, which could be effected by flattening out the nozzle-cap, and thus extending the width of the discharge-openings $b^3$, or, if preferred, in some instances I might dispense entirely with the nozzles and simply provide the conveyer-pipe with openings for the purpose, as shown in Fig. 3.

The operation of the device is as follows: The grain-binder being put in motion, the fan through the mechanism described will be rapidly rotated, thereby causing air to be fed to the conveyer-pipe B under considerable pressure. The air in escaping will blow the stalks of grain against the cutter-knives and then over upon the conveyer, substantially in the manner shown in Fig. 1. Should the grain be standing, the conveyer-pipe will be raised a considerable distance above the ground; but should the grain be lying flat the conveyer-pipe will be dropped or lowered close to the ground. It will be apparent that in the operation of this device it is immaterial as to the condition of the grain. As herein shown, the discharge of air is always at right angles to the line of movement of the conveyer; but it is to be understood that I do not wish to be confined to this exact line of projection of air. It is also to be understood that I do not limit myself to the exact arrangement of parts herein shown, as they may be differently arranged and widely departed from and still be within the scope of my invention.

The object of the horizontal transverse slot $b^3$ is to equalize the pressure and also to concentrate the force in a horizontal direction, so as to produce a level draft of wind and throw the wheat in a uniform manner on the canvas conveyer. The improvement may also be used on heading-machines in the same manner. I have not shown such application, but I desire it to be understood that this use of my invention is within the scope of the appended claims.

Having thus fully described my invention, what I claim as new, and desire to secure by Letters Patent, is—

1. The combination with the supporting-frame of a grain binder or header, of a blast-generating apparatus supported thereon, a rigid blast-delivery pipe disposed in front of the cutting and conveying mechanism, a flexible air-pipe connecting the rigid delivery-pipe with the blast-generating apparatus, a support carrying the delivery-pipe and hinged or pivoted to the frame of the machine, and means for swinging the support in a vertical direction to adjustably raise and lower the delivery-pipe.

2. The combination with the supporting-frame of a grain binder or header, of a blast-fan rigidly supported thereon, a blast-delivery pipe arranged in front of the cutting and conveying mechanism, a flexible connection between the blast-fan and the said pipe, and combined supporting and shifting means supported on the frame and connected with the pipe.

3. The combination with the conveyer of a grain binder or header, of an air-conveying pipe arranged contiguous thereto and carrying a plurality of discharge-nozzles, and blast mechanism in communication with the said pipe.

4. The combination with the conveyer of a grain binder or header, of an air-conveying pipe closed at one end, a plurality of nozzles carried thereby and having their discharge ends facing toward the conveyer, blast mechanism in communication with the air-conveying pipe, and raising and lowering mechanism connected with the air-conveying pipe.

5. The combination with the conveyer of a grain binder or header, of a platform, a shaft supported in suitable bearings thereon and driven from the binder mechanism, a bevel-gear carried by the shaft, a fan-casing also supported on the platform and having a shaft carrying a bevel-gear in mesh with the first-named gear, an air-distributing pipe carrying a plurality of nozzles having their discharge ends facing toward the conveyer, a flexible connection between the fan-casing and the air-distributing pipe, and raising and lowering mechanism connecting with the said pipe, all substantially as and for the purpose described.

6. In combination with the platform conveyer of a grain-binder, of a pneumatic blast device arranged in front of the cutting apparatus thereof and provided with a plurality of curved discharge-nozzles.

7. In combination with the platform conveyer of a grain-binder, of a pneumatic blast device arranged in front of the cutting apparatus thereof and provided with a plurality of curved discharge-nozzles, each of which is formed with a horizontal outlet-opening.

In testimony that I claim the foregoing as my own I have hereto affixed my signature in the presence of two witnesses.

EDWARD HAFERMEHL.

Witnesses:
 H. H. ELDREDGE,
 JAMES F. LAUD.